(12) United States Patent

Moncada

(10) Patent No.: US 12,669,176 B1

(45) Date of Patent: Jun. 30, 2026

(54) METHOD AND SYSTEM FOR MINIMIZING ENERGY CONSUMPTION AND MAXIMIZING EFFICIENCY IN ENGINES AND MACHINERY WITH RECIPROCATING PARTS

(71) Applicant: Armando Moncada, Honolulu, HI (US)

(72) Inventor: Armando Moncada, Honolulu, HI (US)

( * ) Notice: Subject to any disclaimer, the term of this patent is extended or adjusted under 35 U.S.C. 154(b) by 0 days.

(21) Appl. No.: 19/359,931

(22) Filed: Oct. 16, 2025

Related U.S. Application Data

(60) Provisional application No. 63/862,114, filed on Aug. 12, 2025.

(51) Int. Cl.
*F16J 1/10* (2006.01)
*F02B 75/32* (2006.01)

(52) U.S. Cl.
CPC ................ *F16J 1/10* (2013.01); *F02B 75/32* (2013.01)

(58) Field of Classification Search
CPC .................................... F16J 1/10; F02B 75/32
See application file for complete search history.

(56) References Cited

U.S. PATENT DOCUMENTS

| | | | | |
|---|---|---|---|---|
| 1,180,536 A | * | 4/1916 | Pownall | F04B 39/0016 137/516.21 |
| 1,281,490 A | * | 10/1918 | Billado | F15B 11/12 92/138 |

| | | | | |
|---|---|---|---|---|
| 1,503,369 A | * | 7/1924 | Lavoie | F16J 1/005 92/175 |
| 2,138,644 A | * | 11/1938 | Read | F01B 17/04 92/175 |
| 2,349,161 A | * | 5/1944 | Frimel | F04B 7/0053 92/135 |
| 3,033,626 A | * | 5/1962 | Corley | F16J 1/001 92/175 |
| 3,118,381 A | * | 1/1964 | Keil | F04B 1/053 92/135 |
| 3,550,376 A | * | 12/1970 | Esteve | B60T 17/18 92/135 |
| 4,006,797 A | * | 2/1977 | Keske | F16N 13/14 417/471 |
| 4,428,276 A | * | 1/1984 | Loveless | F16J 15/32 277/910 |
| 4,442,758 A | * | 4/1984 | Groll | F02B 75/28 92/143 |
| 4,557,228 A | * | 12/1985 | Samodovitz | F02B 75/38 123/78 E |

(Continued)

FOREIGN PATENT DOCUMENTS

| | | | | |
|---|---|---|---|---|
| CN | 105422265 A | * | 3/2016 | F02F 3/00 |

*Primary Examiner* — Thomas E Lazo

(74) *Attorney, Agent, or Firm* — Plager Schack LLP; Mark H. Plager; Kara K. Verryt

(57) ABSTRACT

A system for improving efficiency and minimizing energy consumption in machinery with reciprocating parts may include a piston positioned within a piston cavity in the machinery, the piston having a center rod with a top cap and bottom cap attached to opposite ends thereof, the top cap and bottom cap having diameters larger than a diameter of the center rod; a first spring positioned adjacent to the top cap within the piston cavity; and a second spring positioned adjacent to the bottom cap within the piston cavity.

6 Claims, 4 Drawing Sheets

(56)            References Cited

U.S. PATENT DOCUMENTS

| | | | | |
|---|---|---|---|---|
| 5,540,052 | A * | 7/1996 | Sieke | F15B 21/12 |
| | | | | 60/540 |
| 5,953,980 | A * | 9/1999 | Ota | F04B 1/124 |
| | | | | 92/172 |
| 8,963,380 | B2 * | 2/2015 | Fullerton | H02K 21/24 |
| | | | | 310/12.21 |
| 2003/0177900 | A1 * | 9/2003 | Shiina | F04B 27/0878 |
| | | | | 92/175 |
| 2010/0162998 | A1 * | 7/2010 | Graef | F01B 11/08 |
| | | | | 123/46 SC |
| 2015/0075368 | A1 * | 3/2015 | Koontz | F16J 1/005 |
| | | | | 92/138 |
| 2016/0123224 | A1 * | 5/2016 | Al Salameh | F02B 75/32 |
| | | | | 123/197.2 |
| 2017/0051731 | A1 * | 2/2017 | Ott | F04B 53/146 |

* cited by examiner

METHOD AND SYSTEM FOR MINIMIZING ENERGY CONSUMPTION AND MAXIMIZING EFFICIENCY IN ENGINES AND MACHINERY WITH RECIPROCATING PARTS

RELATED APPLICATION

This application claims priority to provisional patent application U.S. Ser. No. 63/862,114 filed on Aug. 12, 2025, the entire contents of which is herein incorporated by reference.

BACKGROUND

The embodiments described herein relate generally to minimizing energy consumption and maximizing efficiency in machinery with reciprocating parts and, more particularly, to a method and system for minimizing energy consumption and maximizing efficiency in compressors, internal combustion engines, generators, and the like by using springs adjacent to pistons to conserve inertia, by using high strength to weight ratio materials to lower the inertia, and by minimizing the weight of the piston by removing unnecessary material.

In machinery with reciprocating parts, such as internal combustion engines, generators, compressed air generators, and compressors, energy is converted from one state to another, such as mechanical pressure to electrical energy or combustive force to mechanical force. Conventionally, pistons are made of materials, such as steel alloys, which have a relatively low strength to weight ratio. Conventional pistons may also be solid and may employ excessive unnecessary material. Use of a piston involves momentum of the mass, which is continuously accelerating, decelerating, and then reversing directions. Conventional systems require significant energy for the pistons to switch direction. As such, the existing systems involve unnecessarily elevated inertia.

Therefore, what is needed is a method and system for minimizing inertia and energy consumption and maximizing efficiency in machinery with reciprocating parts, such as compressors, internal combustion engines, generators, and the like.

SUMMARY

Some embodiments of the present disclosure include a system for improving efficiency and minimizing energy consumption in machinery with reciprocating parts. The system may include a piston positioned within a piston cavity in the machinery, the piston having a center rod with a top cap and bottom cap attached to opposite ends thereof, the top cap and bottom cap having diameters larger than a diameter of the center rod; a first spring positioned adjacent to the top cap within the piston cavity; and a second spring positioned adjacent to the bottom cap within the piston cavity.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figures 1, 2, 3:
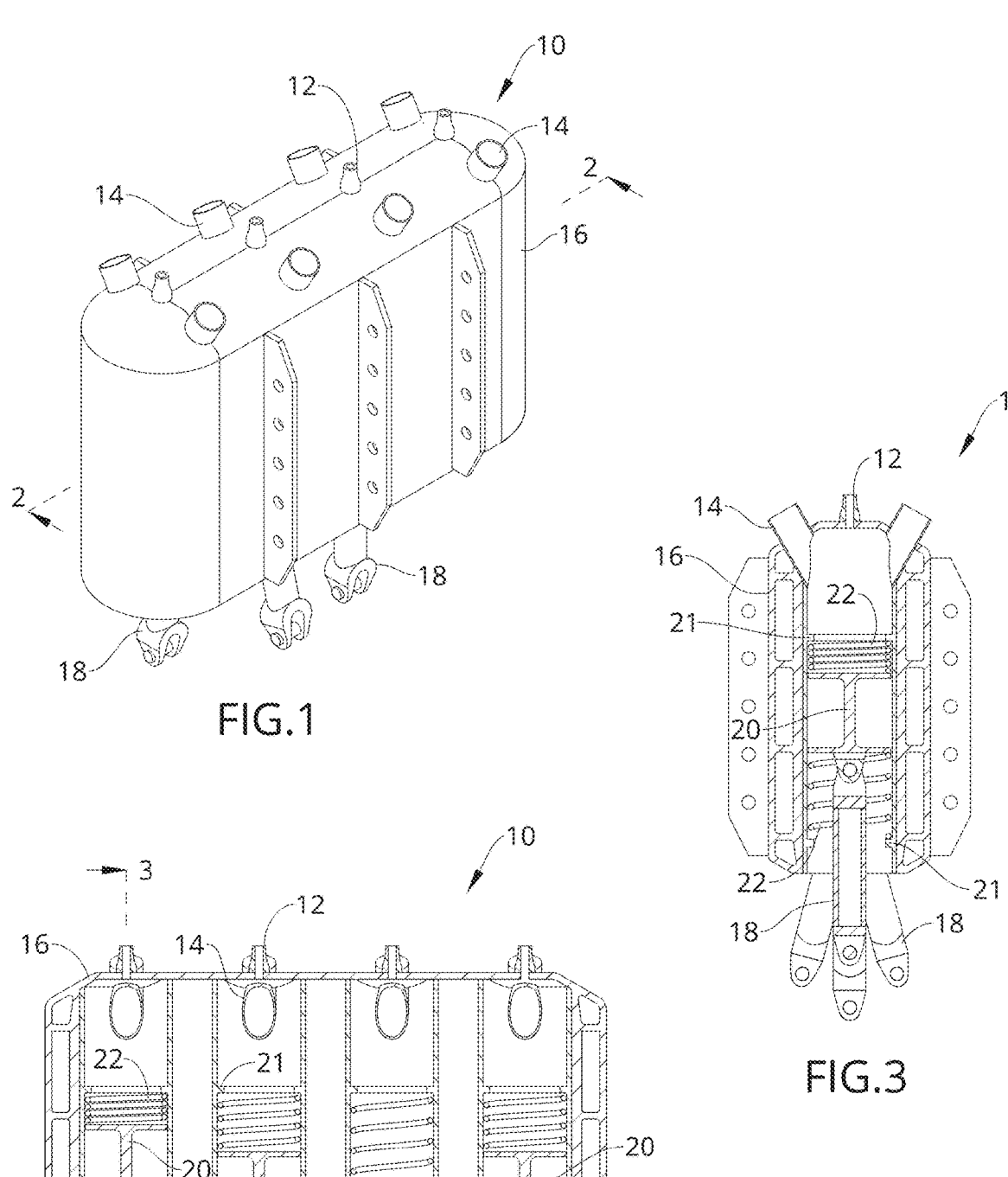
FIG. 1 is perspective view of one embodiment of the present disclosure.
FIG. 2 is a section view of one embodiment of the present disclosure, taken along line 2-2 in FIG. 1.
FIG. 3 is a section view of one embodiment of the present disclosure, taken along line 3-3 in FIG. 2.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a method and system for improving efficiency and minimizing consumption in engines, compressors, and the like and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-10, some embodiments of the present disclosure include a method and system for improving efficiency and minimizing energy consumption in machinery with reciprocating parts, the system comprising a piston positioned within a piston cavity in the machinery, the piston comprising a center rod with a top cap and bottom cap attached to opposite ends thereof, the top cap and bottom cap having diameters larger than a diameter of the center rod; a first spring positioned adjacent to the top cap within the piston cavity; and a second spring positioned adjacent to the bottom cap within the piston cavity. The system may further comprise a ring, such as a hollow ring, attached to an interior surface of the piston cavity where the spring may interface, wherein an opposite side of the spring interfaces against the piston.

As described above, the system may comprise a piston having a center rod, a top cap, and a bottom cap. As such, the piston may be shaped similarly to an I-beam in cross-section, wherein material is excavated toroidally along the waistline (or center rod) of a cylinder to create the I-shape. The I-shape may reduce overall weight and unnecessary materials. The piston may be made of a material, such as titanium, having a high strength to weight ratio.

As also mentioned above, the piston may be braced within a piston cavity by a first spring and a second spring. The inclusion of springs may help conserve inertia of the moving piston, enabling input and output forces to be transferred without interference as inertial drag. As such, the input and output forces operate at a higher efficiency because (a) the springs conserve the inertia of the moving part, and (b) the moving parts have reduced inertia.

Exemplary applications for the system of the present disclosure are shown in the Figures. Specifically, as shown in FIGS. 1-3, the system may be incorporated into an internal combustion engine 10, wherein the internal combustion engine 10 comprises an engine block 16 with a plurality of air intake/exhaust ports 14 and a plurality of fuel injectors 12 extending into a top end of the engine block 16; a plurality of camshaft linkages 18 extending outward from a bottom end of the engine block 16; and a piston cavity extending between a fuel injector 12 and a respective camshaft linkage 18. A piston 20 may be positioned within the piston cavity with a first spring 22 positioned between the piston 20 and an internal surface of the top end of the engine block 16 and a second spring 22 positioned between the piston 20 and an internal surface of the bottom end of the engine block 16. In embodiments, a spring retaining ring or clip 21 may be positioned within the interior of the piston cavity proximate to the top end and to the bottom end. As shown, the camshaft linkage 18 may be operatively attached to the bottom end of the piston, such that when the piston moves up and down within the cavity, the camshaft linkage 18 also moves. Beneficially, to avoid variation in rates of thermal expansion and to preserve material ratio consistency, uniformity in material selection may be employed in heated areas.

Figure 4:
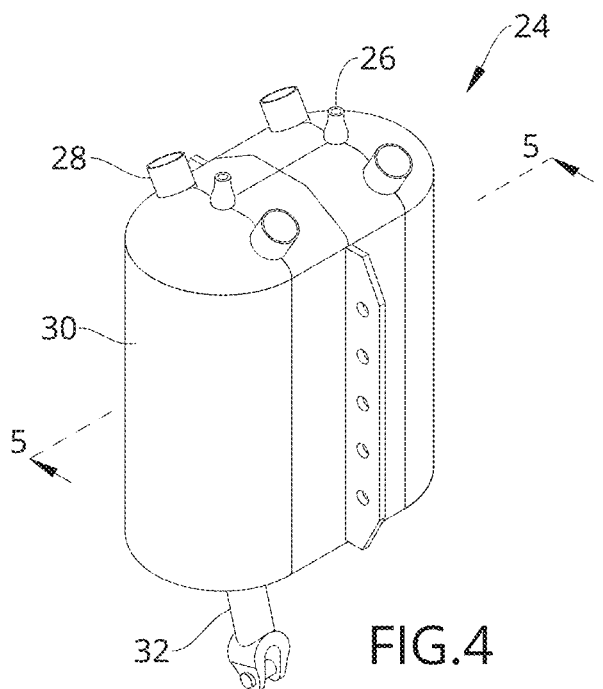
FIG. 4 is a perspective view of one embodiment of the present disclosure.
Figure 6:
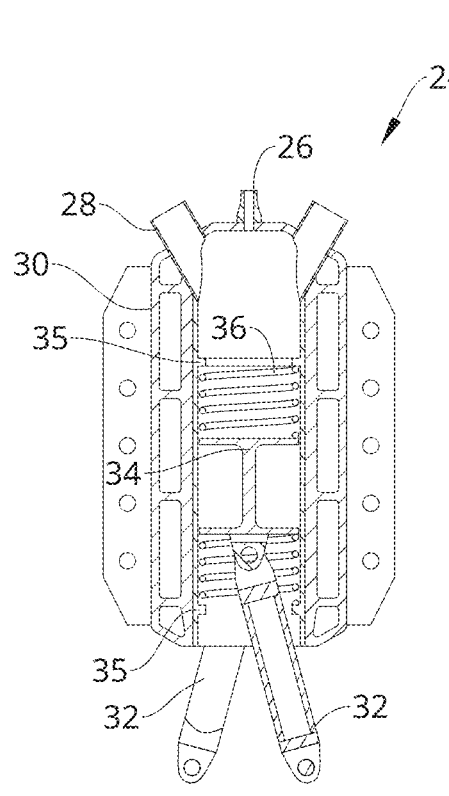
FIG. 6 is a section view of one embodiment of the present disclosure, taken along line 6-6 in FIG. 5.
Figure 5:
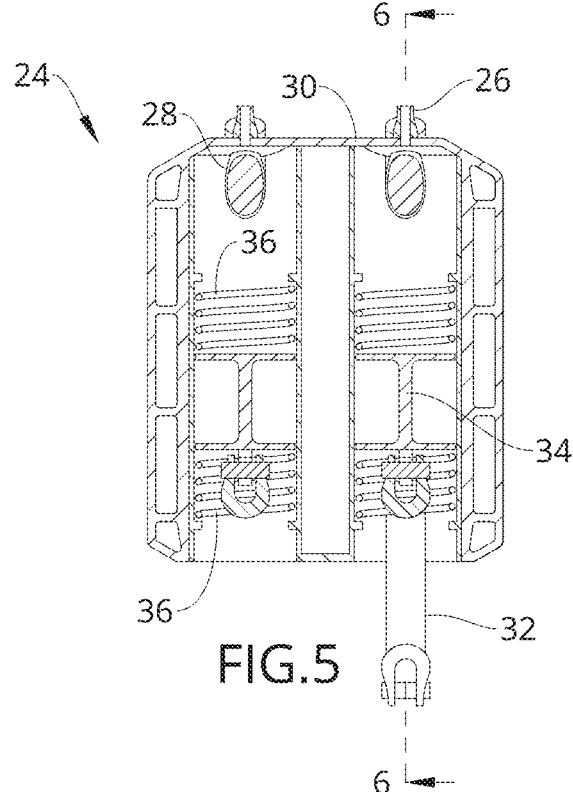
FIG. 5 is a section view of one embodiment of the present disclosure, taken along line 5-5 in FIG. 4.

As shown in FIGS. 4-6 and similar to the internal combustion engine, the system may be incorporated into a generator 24 comprising an engine block 30 with a plurality of air intake/exhaust ports 28, a plurality of fuel injectors 26, and a plurality of camshaft linkages 32. The generator 24 may comprise at least one piston cavity including the piston 34 and springs 36 positioned therein. In embodiments, the piston cavity may include a pair of retaining rings or clips 35 that function to retain the springs 36 into their intended areas.

Figure 7:
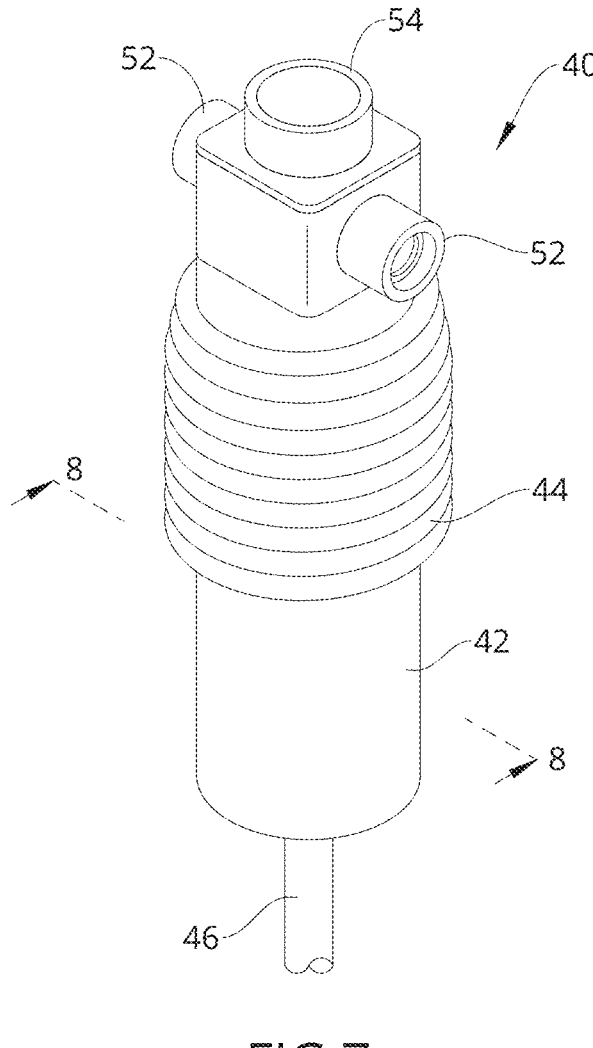
FIG. 7 is a perspective view of one embodiment of the present disclosure.
Figure 8:
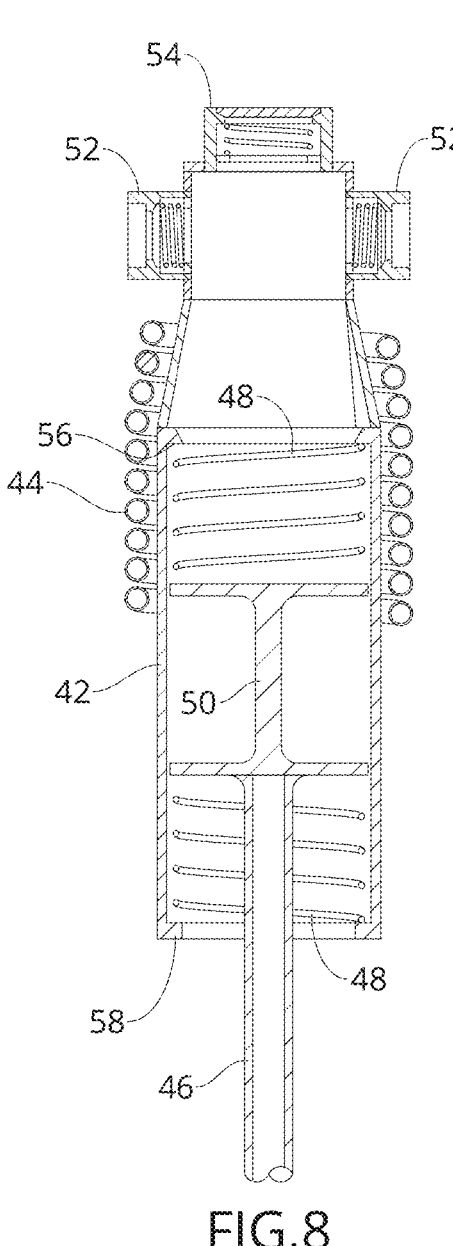
FIG. 8 is a section view of one embodiment of the present disclosure, taken along line 8-8 in FIG. 7.

In another exemplary application, and as shown in FIGS. 7 and 8, the system may be incorporated into a compressor 40, wherein the compressor 40 comprises a compressor body 42 with a plurality of air intakes 52, an output compressed air line connection 54, a hollow tubing 44 for carrying and conserving waste heat, and a piston cavity within the compressor body 42. A piston 50 and a pair of springs 48 may be positioned within the piston cavity, wherein a piston rod 46 may be attached to and extend downward from the piston 50 and out of the compressor body 42, where it connects to a linear motor (not shown). An upper spring retaining ring 56 and a lower opening/spring retaining ring 58 may be operatively attached or built into the compressor body within the piston cavity to maintain desired position of the springs 48.

Figures 9, 10:
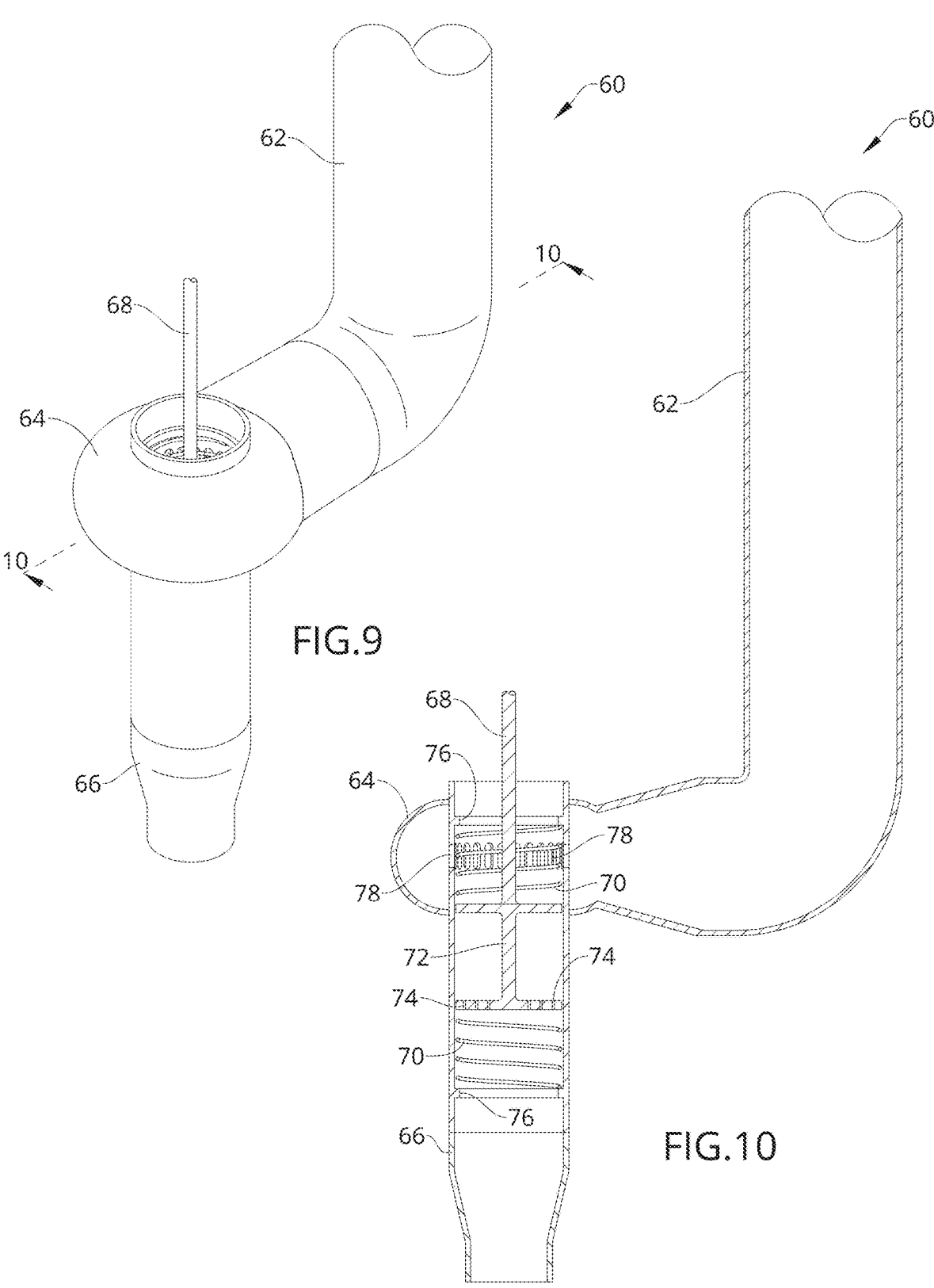
FIG. 9 is a perspective view of one embodiment of the present disclosure.
FIG. 10 is a section view of one embodiment of the present disclosure, taken along line 10-10 in FIG. 9.

A last exemplary application is shown in FIGS. 9 and 10, wherein the system is incorporated into a compressed air generator 60, the compressed air generator 60 comprising a low pressure piping 62 attached to a toroid 64 and a high pressure piping 66 extending downward from the toroid 64. A piston cavity may be positioned within the high pressure piping 66, wherein the high pressure piping includes perforations 78 extending therethrough. A piston 72 and a pair of springs 70 may be positioned within the piston cavity. The piston 72 may comprise a center rod, a top cap, and a bottom cap, wherein the bottom cap comprises a plurality of orifices 74 extending therethrough. A pair of spring retaining rings 76 may be positioned within the cavity proximate to distal ends of each spring 70. A piston rod 68 may be attached to and extend from an exterior surface of the top cap through the toroid 64 wherein it connects to a linear generator (not shown).

In use, a mechanical input force via compressed air or combustion of fuel provides input force into a cavity that is comprised of either piping or a hollow cylinder inside of a generator or engine. In the case of a piston compressor (reciprocating compressor), the input force is electromechanical in nature and drives the compressor piston in this manner. The piston moves back and forth within the cavity and is braced by the springs to conserve inertia of the moving part, enabling input and output forces to be transferred without interference as inertial drag.

The system of the present disclosure provides improved efficiency due to a few main concepts. First, the springs conserve kinetic inertia in systems with components that are moving in a reciprocating manner, because they reverse the movement of the kinetic energy and, therefore, may be considered a critical components for the increase of the efficiency in the system. Less energy is required to reverse the direction of the part when springs are employed. Next, inertia of the reciprocating part(s) is closely analyzed to discover a method for material removal and reduction of weight without compromising structural integrity or functionality. Less mass within the reciprocating part equates to less energy required to conserve its inertia in the first place. Lastly, very high strength to weight ratio materials are substituted for current materials to further reduce weight of moving parts within the system. In some cases, additional strategies are employed, such as allowing the materials to have a hollow interior. In some cases, to avoid differing rates of thermal expansion, the high strength to weight ratio material may be uniformly substituted among the components, and the substitution may spread to other parts that are non-moving and non-reciprocating relative to the greater system.

In summary, inertia is reduced in systems with reciprocating moving parts using a three-part strategy: (1) springs are added to brace moving components to conserve inertia, (2) moving components are redesigned out of very high strength to weight ratio materials, without compromising functionality of structural integrity, and (3) moving components are structurally redesigned to remove unnecessary mass and minimize weight in the design of the current components. The redesign of the reciprocating parts is applicable to internal combustion engines, fuel-based generators, compressed air generators, and compressors, as well as any other type of machinery with reciprocating parts. The result is very efficient internal combustion engines, generators, and compressors in addition to other machinery or devices.

While exemplary applications are described above, it is envisioned that the system may be incorporated into any mechanical system with a reciprocating moving part that moves back and forth in a linear or nearly linear motion, such as in cryogenic cooling equipment, linear generators, wind "sail" type power plants, hydropower generators, refrigerant piping systems, and the like. When incorporated into refrigerant piping, the system may be included after the expansion valve as an energy recovery device similar to a compressed air generator as well as the compressor, allowing for an increase in efficiency to occur twice.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A system for improving efficiency and minimizing energy consumption in machinery with reciprocating parts, the system comprising:

a piston positioned within a piston cavity in the machinery, the piston comprising:

a center rod with a top cap and bottom cap attached to opposite ends thereof, the top cap and bottom cap having diameters larger than a diameter of the center rod;

a first spring positioned adjacent to the top cap within the piston cavity; and a second spring positioned adjacent to the bottom cap within the piston cavity, wherein:

the machinery comprises a member selected from the group consisting of an internal combustion engine, a generator, a compressor, and a compressed air generator;

each of the first spring and the second spring are concentrically aligned with the piston cavity.

2. The system of claim 1, further comprising a first ring attached to an interior surface of a top end of the piston cavity, wherein:

a first end of the first spring interfaces the first ring at the top end of the piston cavity; and a second end of the first spring interfaces against the piston.

3. The system of claim 2, further comprising a second ring attached to an interior surface of a bottom end of the piston cavity, wherein:

a first end of the second spring interfaces the second ring at the bottom end of the piston cavity; and a second end of the second spring interfaces against the piston.

4. The system of claim 3, wherein the piston comprises titanium.

5. The system of claim 1, wherein:

the piston has an I-shaped cross-section; and material is excavated toroidally along a waistline of a cylinder to create the I-shaped cross-section.

6. The system of claim 1, wherein material consistency of the system is maintained in heated areas.

* * * * *